United States Patent Office 3,305,561
Patented Feb. 21, 1967

3,305,561
AROMATIC CYCLIC IMIDE PROCESS
William G. Toland, San Rafael, Calif., assignor to Chevron Research Company, a corporation of Delaware
No Drawing. Filed Mar. 1, 1965, Ser. No. 436,368
10 Claims. (Cl. 260—326)

This application is a continuation-in-part of my application Serial No. 157,578, filed December 6, 1961 (now abandoned).

This invention relates to a liquid phase process for the production of aromatic cyclic imides. More particularly, this invention relates to the production of aromatic cyclic imides by the liquid phase ammoxidation of orthodimethyl-substituted aromatic hydrocarbons in the presence of a manganese bromide catalyst. Cyclic aromatic imides are commercially desirable chemical intermediates useful in the production of dyes, primary amines, amino acids, insecticides, etc.

It is known to prepare aromatic cyclic imides by contacting a vapor mixture of an orthodimethyl substituted aromatic hydrocarbon, for example, ortho-xylene, molecular oxygen, and ammonia, with solid vanadium oxide-type oxidation catalysts at elevated temperatures, for example at about 400° C. and higher. In addition to the usual disadvantages of operation at the extremely high dilution of vapor phase reactions, such as explosive mixture problems, recovery of product from a dilute gas stream, and the like, the vapor phase processes suffer from the problems associated with the concurrent production of hydrogen cyanide and its disposal.

It has now been discovered that aromatic cyclic imides may be prepared by reacting lower alkyl substituted aromatic hydrocarbons having at least two methyl-substituent groups in the ortho relationship, and having less than 4 carbocyclic aromatic rings, in a liquid phase reaction with oxygen and ammonia at a temperature in the range 115° C. to 260° C. The reaction is catalyzed by having dissolved in the liquid reaction medium from about 0.1 to 10 weight percent of manganese bromide based upon the hydrocarbon feed, provided the ammonia-oxygen ammoxidation agent contains from about 0.1 to 2 mols of oxygen.

In this reaction, the catalytic action of manganese bromide is unique and specific. Other liquid phase oxidation catalysts, such as cobalt compounds, with or without the bromide anion, and other manganese compounds, in the absence of bromine or an available bromide, do not function satisfactorily as catalysts in this system, and are presumably poisoned by the conjoint presence of ammonia and oxygen under ammoxidative conditions. Hydrogen cyanide by-product production and disposal problems are not encountered in the present process. Surprisingly, the liquid phase ammoxidations of the present invention are not subject to the serious corrosion problems experienced in conventional heavy metal bromide catalyzed oxidations.

In accordance with the invention process, two methyl groups attached in the ortho relationship to each other on a carbocyclic-aromatic nucleus are converted to a cyclic imide, for example, such as the conversion of o-xylene to phthalimide.

By lower alkyl is meant alkyl radicals having less than 5 carbon atoms per group.

Aromatic cyclic imides are stable under liquid phase ammoxidation conditions; and, therefore, the process is useful for the production of aromatic compounds having more than one cyclic imide functional group attached to the carbocyclic nucleus, for example, the imide obtained by converting both pairs of orthodimethyl groups of durene to cyclic imides.

Operable temperatures for the process are in the range from about 115° C. up to about 260° C. At the higher temperatures, it may be necessary to use superatmospheric pressures in order to maintain the liquid phase required. Excellent results are obtained when the ammoxidation agent comprises anhydrous ammonia and an oxygen-containing gas, such as air, and the agent is preconstituted before introduction into the reaction zone. The agent may also be prepared in situ wherein ammonia and oxygen are introduced into the reaction zone in separate streams.

In general, the ammoxidation agent composition may vary. It may contain as much as two mols of ammonia per mol of oxygen and as little as 0.2 mol of ammonia per mol of oxygen. Qualitatively, there is an optimum ammonia to oxygen ratio for each set of reaction conditions and particular feed. As the optimum is exceeded, the rate of production of aromatic cyclic imide falls off until at about a ratio of two mols of ammonia per mol of oxygen present in the ammoxidation agent, for all systems, the ammoxidation is to all practical purposes inhibited as a result of deactivation of the catalyst. At the lower process temperatures, the ammonia to oxygen ratio of the ammoxidation agent is desirably in the lower range, and may be as low as 0.1 mol of ammonia per mol of oxygen. Particularly desirable ammonia to oxygen ratios for the ammoxidation agent are in the range 0.2–2.0 to 1.

In practice mixtures of oxygen and ammonia per se as above defined may be used, and also there may be present in the ammoxidation mixture inert gases such as nitrogen and the like. The use of air with added ammonia is preferred.

In an initial operation, for example, where an unfamiliar feed is to be employed, the ammoxidation agent to be employed is desirably one having a low ammonia to oxygen ratio, for example, about 0.2–0.1 and even lower. Having established that oxidation of the feed is progressing, as shown by the production of water or oxygen consumption, one may then gradually increase the ammonia content of the ammoxidation agent until a reduction is noted in the oxygen uptake rate. The optimum ammonia-oxygen ratio for that reaction system will be slightly less than that at which the reduction in oxygen uptake occurred. Where a variation in the oxygen utilization is subsequently experienced, it may be desirable to adjust the ammonia-oxygen ratio of the ammoxidation agent in order to maintain the optimum ratio. Similarly, the optimum may be achieved by reducing the oxygen content of the ammoxidation agent while keeping the ammonia content constant.

Should the manganese bromide catalyst inadvertently become deactivated by the use of an ammoxidation agent containing too high an ammonia-oxygen mol ratio, recovery of the catalyst activity is obtainable by substantially reducing the ammonia content of the agent and thereafter increasing the ammonia content of the agent when oxygen utilization has resumed. Frequently, the addition of small amounts of ammonia bromide to the liquid phase, for example, up to as much as 50 mol percent of the manganese catalyst employed, accelerates the catalyst recovery.

The amount of manganese bromide catalyst which may be used, stated as weight percent of the aromatic hydrocarbon feed, may be as little as 0.1 and as much as 10 and even higher. The range from about 1 to about 5 is preferred. The catalyst may be introduced into the reaction zone as manganese bromide per se, or it may be produced in situ, for example, by the introduction of a manganese salt of an organic carboxylic acid, i.e., acetic acid, toluic acid, etc., and ammonium bromide or the equivalents (including manganese metal-hydrogen bromide, manganese oxide-hydrogen bromide and the like) thereof into the reaction zone. However produced, only manganese bromide which is in solution in the hydrocarbon feed is effective for the catalysts of the subject liquid phase ammoxidation.

During the course of these liquid phase ammoxidations, some of the bromide may be converted to an unavailable form, and because it is usually desirable to maintain the catalyst at a high degree of activity, provision may be made to counteract this effect. To accomplish this, bromide, in the form of ammonium bromide, for example, may be added initially in excess of that required stoichiometrically to produce the manganese bromide in situ, or small additions may be made at intervals during the course of the oxidation. A 50 mol percent excess of bromide is usually more than adequate for this purpose.

The production of aromatic cyclic imides in accordance with the process of the present invention may be effected in the absence of solvent. However, in the preferred manner of operation, a diluent is used. Suitable diluents are ammoxidation-resistant, unsubstituted and inertly substituted aromatic compounds, such as benzene, naphthalene, biphenyl and the like, including their chloro-, bromo-, and cyano-substituted derivatives. Benzonitrile is a preferred medium.

The following examples will serve to further illustrate the process of the present invention:

*Example 1*

Into a glass oxidation vessel having a means for (1) heating the vessel and its contents; (2) efficient stirring; (3) basal admission of an ammonia-containing oxidizing gas stream; (4) condensing and delivering to a water separation zone effluent oxidation gas stream entrained orthoxylene, solvent, and water; (5) return of the condensed solvent and orthoxylene less water recovered from the entrained gas stream to the oxidation vessel proper, the following charge was placed:

| | Mols |
|---|---|
| Orthoxylene | 0.59 |
| Benzonitrile | 3.0 |
| Manganese acetate | 0.014 |
| Ammonium bromide | 0.018 |

The catalyst elements were dissolved in a known volume of water (several milliliters), and the water was eliminated from the reaction system by heating the charge to its reflux temperature (171° C.) and withdrawing the water via the water separator. While maintaining the charge at the reflux temperature under atmospheric pressure, 171–187° C., a mixture of ammonia and oxygen in the mol ratio of approximately 0.1 was passed into the charge at a rate of 3.5 mols per hour for a period of 1.75 hours, and resulted in a 97 percent conversion of the orthoxylene feed. The reaction mixture containing the aromatic cyclic imide, phthalimide, product was withdrawn from the oxidation vessel, was cooled to ambient temperature, and filtered. The product in the form of the filter cake thus collected was found to consist of 0.164 mol of phthalimide having a melting point range of 228–229° C. and having the following elemental analysis:

| | Calculated | Found |
|---|---|---|
| Weight Percent of: | | |
| Carbon | 65.3 | 65.3–65.4 |
| Hydrogen | 3.4 | 3.46–3.52 |
| Nitrogen | 9.5 | 9.6 |

*Example 2*

Example 1 was repeated, but with the change that a cobalt bromide catalyst was used. Oxidation using this catalyst in the presence of ammonia could not be initiated or, if started in the absence of ammonia, soon ceased upon the addition of ammonia to the oxidation gas stream.

*Example 3*

In a steel oxidation vessel having a means for heating, stirring, basal admission of the ammonia-oxygen gas stream, and water separation, 4 mols of orthoxylene in 12 mols of benzonitrile were ammoxidized in the presence of 0.16 mol of manganese bromide added as in Example 1. The conditions were:

Conditions:
| | |
|---|---|
| Temperature, ° C. | 188–200 |
| Pressure, p.s.i.g. | 60 |
| Time, hours | 5 |
| Ammonia feed rate mols/hr./mol o-xylene | 0.3 |
| Air rate, s.c.f.h. | 10 |
| Conversion, percent | 100 |
| Yield, mol percent: | |
| Phthalimide | 46 |
| o-Tolunitrile | 18 |

When the o-tolunitrile is recycled to the process or when reaction temperatures are increased or reaction times are lengthened, little or none of the o-tolunitrile is recovered, and the yield of phthalimide is substantially increased.

From Examples 1 and 3 it is to be noted that oxygen as well as oxygen-containing gases, such as air, may be employed. Where the oxygen is diluted with an inert gas, there is some increase in total reaction time required. The increase in reaction time is directly related to the relative decrease in oxygen partial pressure as compared to the time required where pure oxygen is used in conjunction with ammonia. The reaction time, temperature, catalyst, and feed concentrtaions are inter-related. Generally, shorter reaction times are associated with higher tempertures, catalyst concentrations, and oxygen partial pressures. Practical reaction times will range from about 0.5 to about 10 hours.

When the manganese bromide catalyzed ammoxidation is carried on in steel reaction vessels, there occurs a negligible amount of corrosion. On the other hand, conventional oxidations, that is, oxidations run under the same conditions but in the absence of ammonia, result in steel corrosion rates as high as 200 mils per year and higher.

From the foregoing examples, it is clear that orthodimethyl groups attached to an aromatic-carbocyclic nucleus may be preferentially converted to cyclic imide under the process conditions. Because the aromatic nucleus merely provides an ammoxidation stable carrier for the orthodimethyl substituents and is, of course, stable and unchanged under these conditions, the man skilled in the art readily recognizes that representative stable aromatic nuclei includes naphthalene, biphenyl, terphenyl, phenanthrene, as well as the benzene nucleus and the like.

Representative aromatic hydrocarbon feed compounds include o-xylene, 1,2-dimethyl naphthalene, 2,3-dimethyl naphthalene, 3,4-dimethyl phenanthrene, 2,3-dimethyl biphenyl isodurene, durene, pentamethyl benzene, 4-t-butyl-o-xylene, prehnitene, pseudocumene and the like, that is di- and higher polyalkyl substituted aromatic hydrocarbons having only lower alkyl substituent groups.

Preferred feeds contemplated are the hydrocarbons of the formula $$Y(CH_3)_2$$

wherein Y is an aromatic carbocyclic radical having less than four aromatic carbocyclic rings and having the two methyl groups in the ortho relationship to each other.

It is not intended that the specific examples herein presented should limit the scope of the invention in any manner.

I claim:
1. Process for the production of aromatic cyclic imides, which comprises reacting in the liquid phase at a temperature in the range from about 115° C. to 260° C. in the presence of mangnaese bromide ammoxidation catalyst, a lower alkyl-substituted aromatic hydrocarbon having less than 4 carbocyclic-aromatic rings and at least one pair of orthodimethyl substituent groups with a gaseous ammoxidation agent consisting essentially of molecular oxygen and ammonia in proportions from about 0.1 to 2.0 mols of ammonia per mol of oxygen, said catalyst being present in the range from about 0.1 to 10 weight percent based upon said hydrocarbon.

2. Process of claim 1, wherein said reaction is in the presence of an inert diluent.

3. Process of claim 2, wherein said diluent is benzonitrile.

4. Process of claim 1, wherein said aromatic hydrocarbon is a lower alkyl-substituted benzene.

5. Process for the production of aromatic cyclic imides, which comprises reacting in the liquid phase at a temperature in the range from about 115° C. to 260° C. in the presence of manganese bromide ammoxidation catalyst, an aromatic hydorcarbon of the formula $$Y(CH_3)_2$$

wherein Y is an unsubstituted aromatic radical having less than 4 carbocyclic aromatic rings and wherein the methyl substituents are in the ortho relationship, with a gaseous ammoxidation agent consisting essentially of molecular oxygen and ammonia in proportions from about 0.1 to 2.0 mols of ammonia per mol of oxygen, said catalyst being present in the range from about 0.1 to 10 weight percent based upon said hydrocarbon.

6. Process of claim 5, wherein said reaction is in the presence of an inert diluent.

7. Process of claim 6, wherein said diluent is benzonitrile.

8. Process for the production of phthalimide, which comprises reacting in the liquid phase at a temperature in the range from about 115° C. to 260° C. in the presence of manganese bromide ammoxidation catalyst, orthoxylene with a gaseous ammoxidation agent consisting essentially of molecular oxygen and ammonia in proportions from about 0.1 to 2.0 mols of ammonia per mol of oxygen, said catalyst being present in the range from about 0.1 to 10 weight percent based upon orthoxylene.

9. The process of claim 8, wherein said reaction is in the presence of an inert diluent.

10. The process of claim 9, wherein said diluent is benzonitrile.

References Cited by the Examiner
UNITED STATES PATENTS 2,838,558   6/1958   Hadley et al. _____ 260—326

FOREIGN PATENTS 825,429   12/1959   Great Britain.
832,995   4/1960   Great Britain.

ALEX MAZEL, *Primary Examiner.*

HENRY JILES, *Examiner.*

M. O'BRIEN, *Assistant Examiner.*